(12) United States Patent
Lalone

(10) Patent No.: US 9,352,735 B2
(45) Date of Patent: May 31, 2016

(54) TRUCK/TRAILER BRAKE CONTROL SYSTEM

(75) Inventor: Duane R. Lalone, Alma, MI (US)

(73) Assignee: Dukay, LLC, Alma, MI (US)

( * ) Notice: Subject to any disclaimer, the term of this patent is extended or adjusted under 35 U.S.C. 154(b) by 277 days.

(21) Appl. No.: 13/270,454

(22) Filed: Oct. 11, 2011

(65) Prior Publication Data

US 2012/0032501 A1 Feb. 9, 2012

Related U.S. Application Data

(63) Continuation-in-part of application No. 11/973,088, filed on Oct. 5, 2007, now Pat. No. 8,042,882.

(51) Int. Cl.
*B60T 15/46* (2006.01)
*B60T 17/04* (2006.01)

(52) U.S. Cl.
CPC .............. *B60T 15/46* (2013.01); *B60T 17/043* (2013.01)

(58) Field of Classification Search
CPC ................................ B60T 15/46; B60T 17/043
USPC ............... 188/3 H; 303/7, 8, 9.65, 9.75, 84.2; 137/595, 625.19; 403/325, 326, 327
See application file for complete search history.

(56) References Cited

U.S. PATENT DOCUMENTS

| | | | |
|---|---|---|---|
| 398,830 A | 3/1889 | Haberom | |
| 1,418,434 A | 6/1922 | Finch et al. | |
| 1,695,245 A | 12/1928 | Dukesmith | |
| 1,801,850 A | 4/1931 | Good | |
| 1,986,799 A * | 1/1935 | Dickey | 188/3 H |
| 2,211,025 A * | 8/1940 | Parkes | 303/8 |
| 2,212,913 A * | 8/1940 | Breese | 303/7 |
| 2,212,918 A * | 8/1940 | Hukill | 303/7 |
| 2,266,817 A | 12/1941 | Schober | |
| 2,676,676 A | 4/1954 | Rumboid | |
| 2,850,330 A * | 9/1958 | Andrews | 303/29 |
| 2,894,763 A | 7/1959 | Kamath et al. | |
| 2,986,426 A * | 5/1961 | Putnam | 303/8 |
| 3,095,245 A * | 6/1963 | Giuseppe | 303/14 |
| 3,228,730 A * | 1/1966 | Schubert | 303/7 |
| 3,234,958 A * | 2/1966 | Butters | 137/328 |
| 3,241,888 A * | 3/1966 | Ternent | 303/7 |
| 3,450,157 A * | 6/1969 | Hewson | 137/595 |
| 3,865,139 A * | 2/1975 | Tolnai | 137/625.19 |
| 3,929,381 A | 12/1975 | Durling | 303/118.1 |
| 4,501,451 A | 2/1985 | Reynolds et al. | |
| 4,602,657 A * | 7/1986 | Anderson et al. | 137/595 |
| 4,629,256 A * | 12/1986 | Fannin | 303/8 |

(Continued)

*Primary Examiner* — Robert A Siconolfi
*Assistant Examiner* — Charles Poon
(74) *Attorney, Agent, or Firm* — Avery N. Goldstein; Blue Filament Law

(57) ABSTRACT

A braking system for a combined tractor-trailer assembly wherein a leading trailer is coupled to a towing tractor and a trailing trailer is coupled to the leading trailer. All of the wheels of the trailers are provided with brakes which may be applied and released in response to the operation of a brake control pedal operated by a driver in the tractor. The brakes also may be applied to the trailing trailer whenever the latter is parked. The brakes of the trailing trailer normally are maintained in applied condition by a spring assisted mechanism when such trailer is parked. Such mechanism normally is disabled by pressurized fluid when the trailer is in service and the pressured fluid is accessible via a valve which simultaneously enables the parking brakes and service brakes simultaneously to be coupled to and uncoupled from the pressure fluid system.

16 Claims, 6 Drawing Sheets

(56) References Cited

U.S. PATENT DOCUMENTS

| | | | |
|---|---|---|---|
| 4,854,585 A * | 8/1989 | Koch et al. | 473/232 |
| 4,880,032 A | 11/1989 | Doutt | 137/625.19 |
| 4,917,354 A * | 4/1990 | Chambers | 251/163 |
| 5,061,015 A * | 10/1991 | Cramer et al. | 303/7 |
| 5,186,433 A * | 2/1993 | Pausch | 251/309 |
| 5,294,052 A * | 3/1994 | Kukesh | 239/112 |
| 5,378,929 A * | 1/1995 | Mor et al. | 303/89 |
| 5,458,357 A | 10/1995 | Wohlhuter | |
| 6,206,028 B1 * | 3/2001 | Holden et al. | 137/271 |
| 6,264,286 B1 * | 7/2001 | Ehrlich et al. | 303/7 |
| 6,758,536 B2 * | 7/2004 | Jacob | 303/7 |
| 6,886,508 B1 * | 5/2005 | Luffy | 123/73 AD |
| 2001/0038084 A1 * | 11/2001 | Smith et al. | 251/174 |
| 2006/0076823 A1 * | 4/2006 | Soupal | 303/7 |
| 2007/0102996 A1 * | 5/2007 | Kelly et al. | 303/3 |
| 2008/0067862 A1 * | 3/2008 | Parrott et al. | 303/7 |
| 2008/0258542 A1 * | 10/2008 | Soupal | 303/7 |
| 2010/0223771 A1 * | 9/2010 | Clever | F01L 1/022 29/234 |

\* cited by examiner

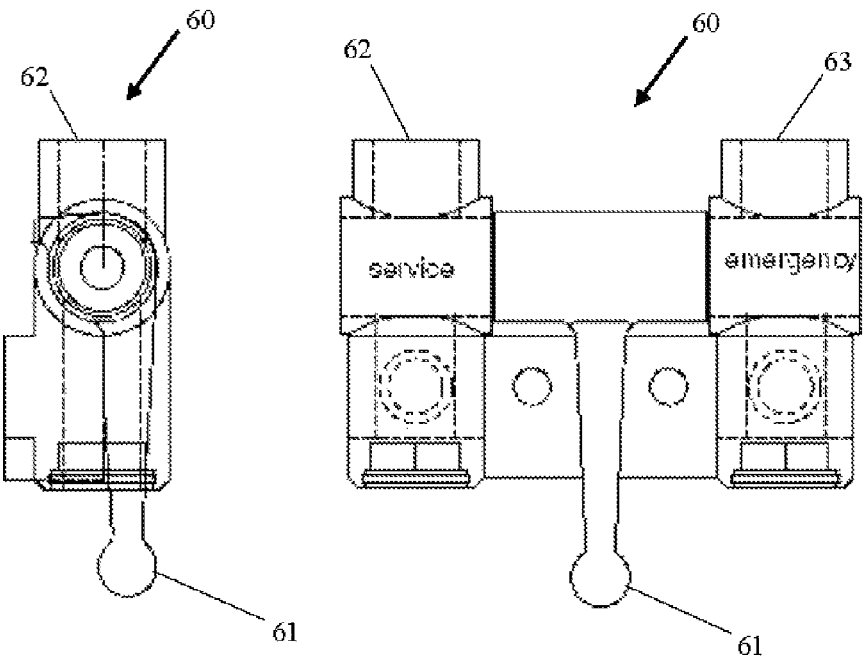
FIG-4A  FIG-4B
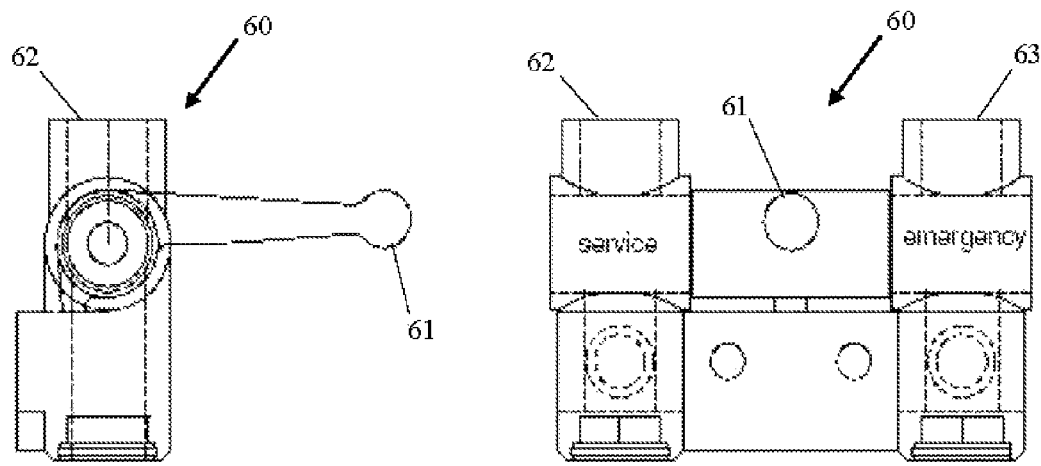
FIG-4C  FIG-4D ball valve ball seat

TRUCK/TRAILER BRAKE CONTROL SYSTEM

CROSS-REFERENCE TO RELATED APPLICATIONS

This application is a continuation-in-part of U.S. application Ser. No. 11/973,088 filed Oct. 5, 2007; now U.S. Pat. No. 8,042,882.

FIELD OF THE INVENTION

This invention relates to a braking system especially adapted for use in conjunction with a tractor-trailer combination wherein the tractor is coupled to a first or leading trailer and such trailer is coupled to a second or trailing trailer.

BACKGROUND OF THE INVENTION

It is conventional to couple a truck tractor to a leading or first trailer and to couple the leading trailer to a second or trailing trailer. The tractor has ground engageable wheels provided with brakes, the first trailer has ground engageable wheels provided with its own brakes, and the second trailer has ground engageable wheels provided with its own brakes. When the tractor and the two trailers are in condition for operation, all of the brakes should be operable from the tractor in response to the driver's actuation of a brake pedal. When the first trailer is uncoupled from the tractor and parked, the brakes of such trailer are applied via a spring assist mechanism. When the second trailer is uncoupled from the first trailer and parked, the brakes of the second trailer are applied via a similar spring assist mechanism. The brakes of the second trailer will continue to be applied until such trailer is coupled to the first trailer and the spring assist mechanism deactivated by means of pressurized fluid. To release the parking brakes of the second trailer and to operate the brakes of both trailers in unison such brakes must be coupled to a fluid (air) compressor which normally is positioned within the tractor.

It is essential that the brakes of both trailers be operable simultaneously so as to apply and release the brakes in unison. However, current brake systems utilize one valve for controlling the application and release of the brakes when the trailer is parked and a second valve for controlling the application and release of the brakes when the second trailer is in service. In some instances, one or the other valve is improperly set, thereby adversely affecting the performance of the second trailer's brakes. For example, if the appropriate valve associated with the parking brake control mechanism is not actuated to couple the spring assist brake mechanism to the source of pressure fluid, the parking brakes of the trailing trailer will not be released, thereby making it impossible for the assembled tractor and trailers to operate effectively.

In the event the spring assisted brake mechanism is uncoupled from the source of pressurized fluid during service operation of the vehicles, the brakes of the trailing trailer may remain in their released or inactive condition, thereby creating a hazardous condition wherein such trailer may be movable when it has been parked. Further, in the event the pedal actuated braking mechanism of the trailing trailer is not disconnected from the pressurized fluid source, it may not be possible to effect proper braking operation under the control of the driver.

Also typical for large vehicles, such as trucks pulling one or more trailers or load carrying attachments, are braking systems configured with two compressed air circuits. One of the compressed air circuits is usually called the "service circuit or line". The other compressed air circuit is usually called the "emergency circuit or line". The emergency circuit applies brakes and stops a truck if the service circuit fails. The brake system has pressure gauges that inform the driver of a failure of the emergency circuit. It is necessary in the case of a failure in either circuit to correct the failure. Air brake failures are not common on trucks driven on paved highways. Failures occur more often on trucks used on unpaved surfaces. Furthermore, multiple trailer configurations are often used to transport construction materials such as sand and gravel and agricultural products. Such activities often involve off road movement. Frequently the second trailer must be disconnected from the first trailer in such operations to facilitate unloading of the trailers.

A principal object of the apparatus disclosed herein is to provide an improved brake control system for use in connection with tractor-trailer combinations wherein there are at least two trailers coupled to one another in tandem.

SUMMARY OF THE INVENTION

Brake control apparatus constructed in accordance with the invention is especially adapted for use in conjunction with tractor-trailer combinations comprising a tractor having ground engaging wheels, some of which are steerable and others of which provide traction. The tractor includes a source of pressurized fluid for use with the tractor's brakes and for use with the brakes of a first or leading trailer coupled to the rear of the tractor, such trailer having ground engageable wheels each of which is provided with a brake mechanism. A second or trailing trailer is coupled in tandem to the leading trailer and it, too, is provided with ground engageable wheels each of which has a braking mechanism associated therewith. The tractor includes a source of pressurized fluid which is coupled to the brakes of both trailers by two separate sets of fluid circuits. It is conventional for the brakes of each trailer to be applied when such trailer is parked, i.e., not in use. One of the pressure fluid circuits is coupled to the spring assist parking brake applying mechanism so as to disable the latter and affect release of the parking brakes when the trailers are to be placed in operation. The pressure fluid source also is coupled to each of the brake mechanisms by a second pressurized fluid circuit via a driver-operated pedal in such manner that, when the driver actuates the pedal, pressure fluid is applied to the brake operating mechanisms of both trailers to apply the brakes to the wheels.

It is conventional to couple the brake pressure fluid conduits of the leading trailer to one of the brake fluid conduits of the trailing trailer via a valve which is operable to enable or disable pressurized fluid flow from the leading trailer to the trailing trailer so as to position the spring assisted parking brake applying mechanism in its brake-release condition. It also is conventional to couple the service pressure fluid line of the leading trailer via a valve to the service fluid pressure line of the trailing trailer in such manner as to enable the brakes of both trailers simultaneously to be applied and released in response to the driver's operation of the brake pedal. For proper operation of the brakes both valves should be either in their open or closed positions. However, the person whose responsibility it is to place the valves in their proper positions sometimes overlooks the adjustment of one or both valves as a consequence of which the operation of the brakes of the trailing trailer is adversely affected.

The brake control apparatus constructed in accordance with the invention includes a dual valve assembly enabling both the aforementioned pressure fluid lines of the trailing trailer to be connected to or disconnected from the pressure fluid source simultaneously via a single valve operator.

BRIEF DESCRIPTION OF THE DRAWINGS

Apparatus constructed in accordance with the presently preferred embodiment of the invention is illustrated in the accompanying drawings wherein:

FIGS. 4A-4D are perspective views of an air or fluid control valve;

DETAILED DESCRIPTION OF THE PREFERRED EMBODIMENTS

The following description of particular embodiment(s) is merely exemplary in nature and is in no way intended to limit the scope of the invention, its application, or uses, which may, of course, vary. The invention is described with relation to the non-limiting definitions and terminology included herein. These definitions and terminology are not designed to function as a limitation on the scope or practice of the invention, but are presented for illustrative and descriptive purposes only.

Figure 1:
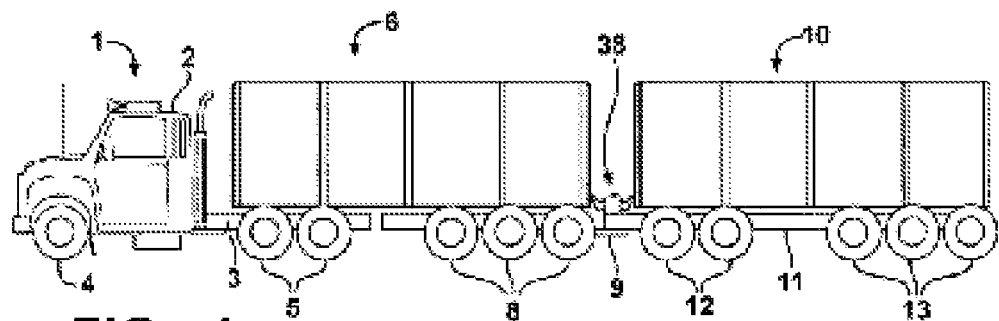
FIG. 1 is a side elevational view of a tractor coupled to a leading trailer which, in turn, is coupled to a trailing trailer.
Figure 2:
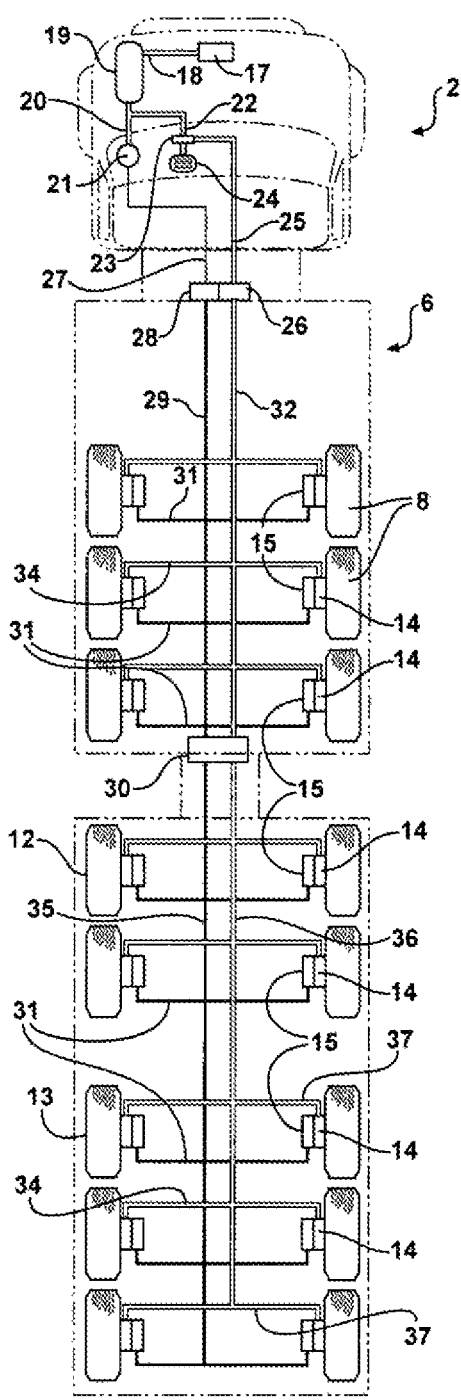
FIG. 2 is a plan view showing diagrammatically the tractor, the leading and trailing trailers, the brake mechanism and the pressure fluid circuits.
Figure 5A:
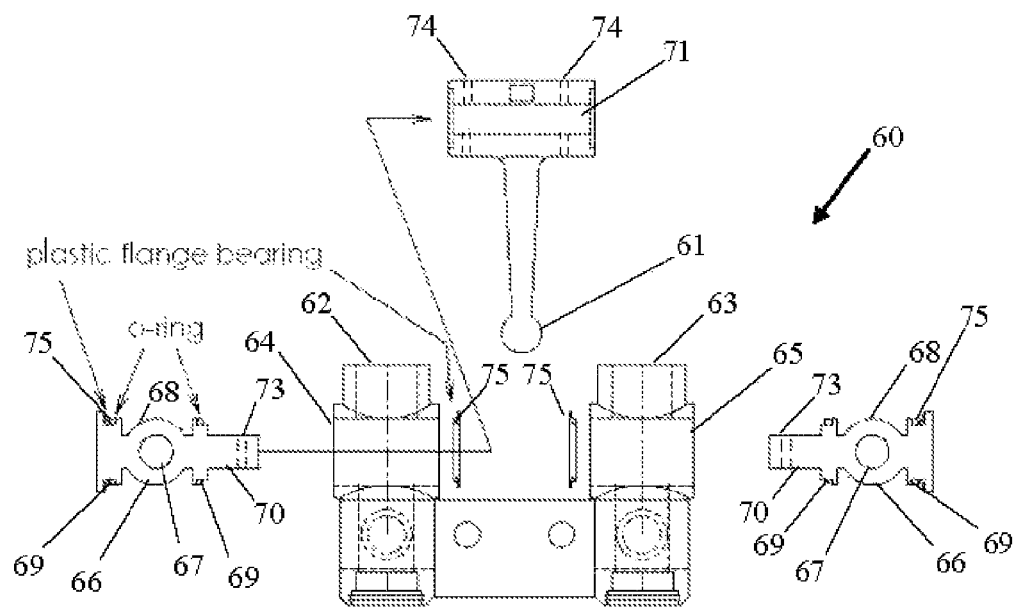
FIGS. 5A and 5B are exploded drawings of the air or fluid control valve of FIGS. 4A-4D.
Figure 5B:
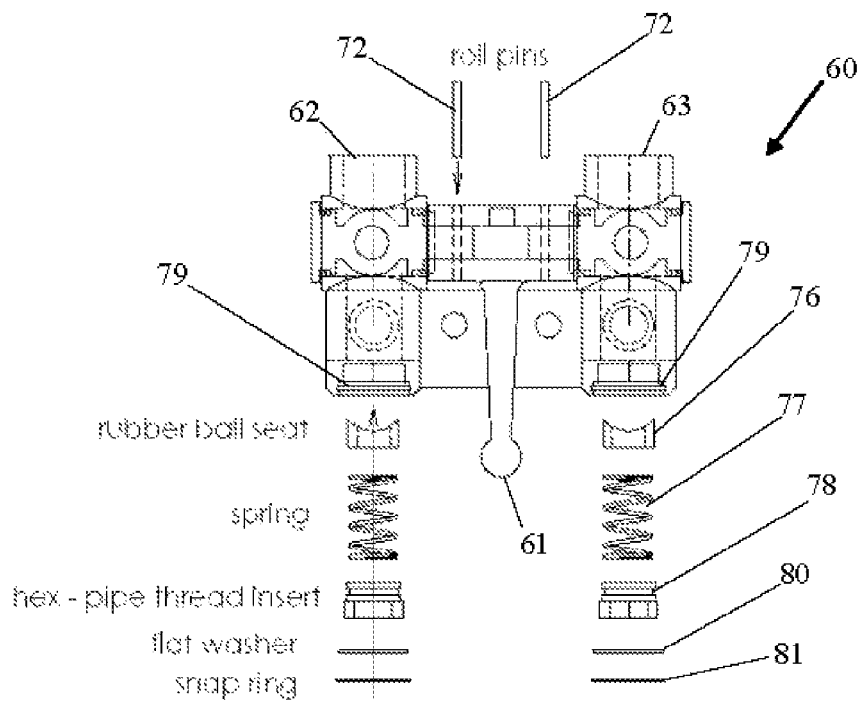
Figure 6A:
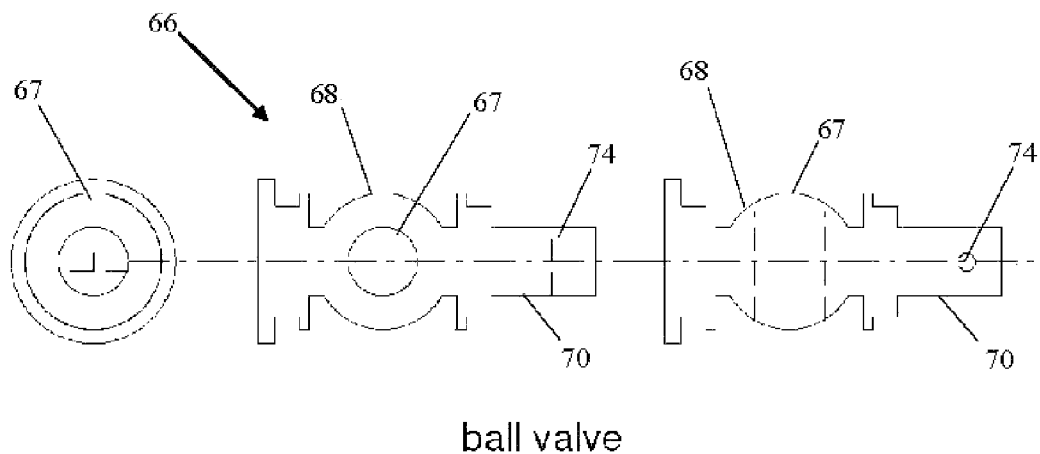
FIGS. 6A and 6B are an enlarged view partly in plan and partly in section of the ball valve assembly and ball seat of control valve of FIGS. 4A-4D.
Figure 6B:
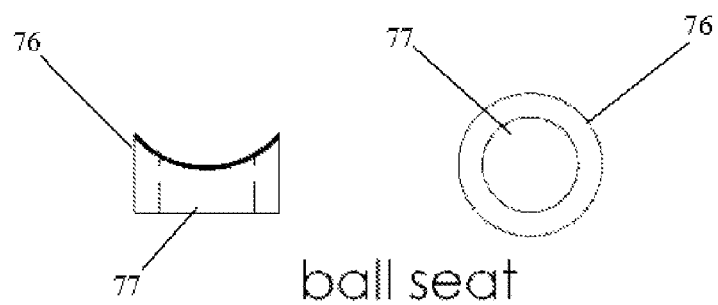

Brake control apparatus according to the invention is adapted for use with a tractor 1 having a cab 2 as shown in FIGS. 1 and 2 supported on a frame 3 provided with steerable ground engaging wheels 4 and traction wheels 5. The frame 3 supports a coupling mechanism, such as a fifth wheel (not shown) to which is coupled a leading trailer 6 having a frame 7 on which is mounted a plurality of ground engageable wheels 8. At the rear of the trailer 6 is a coupling 9 for removably coupling to the leading trailer a trailing trailer 10 having a frame 11, steerable wheels 12 and rear ground engageable wheels 13. The construction and arrangement are such that the tractor 1 is capable of towing both the leading trailer 6 and the trailing trailer 10.

Associated with each of the wheels 4, 5, 8, 12, and 13 is a conventional brake assembly 14 having wheel engageable brakes (not shown) movable between applied and released conditions in a conventional manner. Each brake assembly 14 includes a spring assist assembly 15 of known construction by means of which the brakes constantly are spring biased to their applied condition. The assembly 15 may be of the kind characterized as Life Seal actuators and manufactured by Haldex Brake Products Corporation, of Kansas City, Mo. Each such assembly has a first diaphragm acted on by a spring operable to apply the associated brakes of the assemblies 14. However, the brakes can be released in response to the application of pressure fluid to overcome the force of the springs. Each assembly 15 has a second diaphragm that is responsive to the application and release of fluid pressure to apply and release the brakes under the control of the driver.

Typical pressure fluid circuits for controlling the brakes are illustrated in FIG. 2 and comprise an air compressor 17 mounted in the cab 2 and coupled by a line 18 to a pressurized fluid supply tank 19. In communication with the tank 19 is a pressurized fluid line 20 coupled to an air release valve 21 mounted in the cab. Also coupled to the line 20 is another fluid line 22 which passes through a valve 23 operated by a pedal 24 or other suitable actuator under the driver's control. The valve 23 is coupled to a pressure fluid line 25 (service line) which leads to a junction 26 mounted on the leading trailer 6. The fluid release valve 21 is connected by a suitable line 27 (emergency line) to a junction 28 mounted on the leading trailer 6 adjacent the junction 26.

From the junction 28 extends a pressure fluid line 29 (shown as a single solid line as the emergency line) which extends rearwardly of the trailer 6 to a valve housing 30. The fluid line 29 is coupled to each brake spring assist assembly 15 by branch lines 31. From the pedal-operated valve 23 through the junction 26 extends a pressure fluid line 32 (shown as two parallel lines as the service line) to the valve housing 30. The line 32 is connected to each of the brake assemblies 14 by branch lines 34.

From the control valve housing 30 mounted at the rear of the leading trailer 6 is a pressure fluid conduit 35 (emergency line) which extends in continuation of the conduit 29 and is coupled by branch lines 31 to each of the spring assist brake mechanisms 15 of the trailer 10. Also extending as a continuation of the line 32 from the valve housing 30 is a conduit 36 (service line) which is coupled by branch lines 37 to the brake mechanisms 14 of the trailing trailer.

The construction and arrangement of the pressure fluid system are such that, whenever the leading trailer 6 is parked the parking brakes are applied via the associated spring assist mechanisms 15, and whenever the trailing trailer 10 is parked the parking brakes are applied via the spring assist brake mechanisms 15. Whenever the junction 28 is open and in communication with the supply tank 19, such as when the tractor and trailers are in service, the spring assist mechanisms 15 will be in circuit with the conduits 29, 31, and 35 and disabled, i.e., the brakes will be in their released condition. However, when the driver wishes to apply and release the brakes, the pedal 24 may be actuated so as to enable pressure fluid to flow from the storage tank via the conduits 32, 34, and 36 to the brake assemblies 14.

Figure 3:
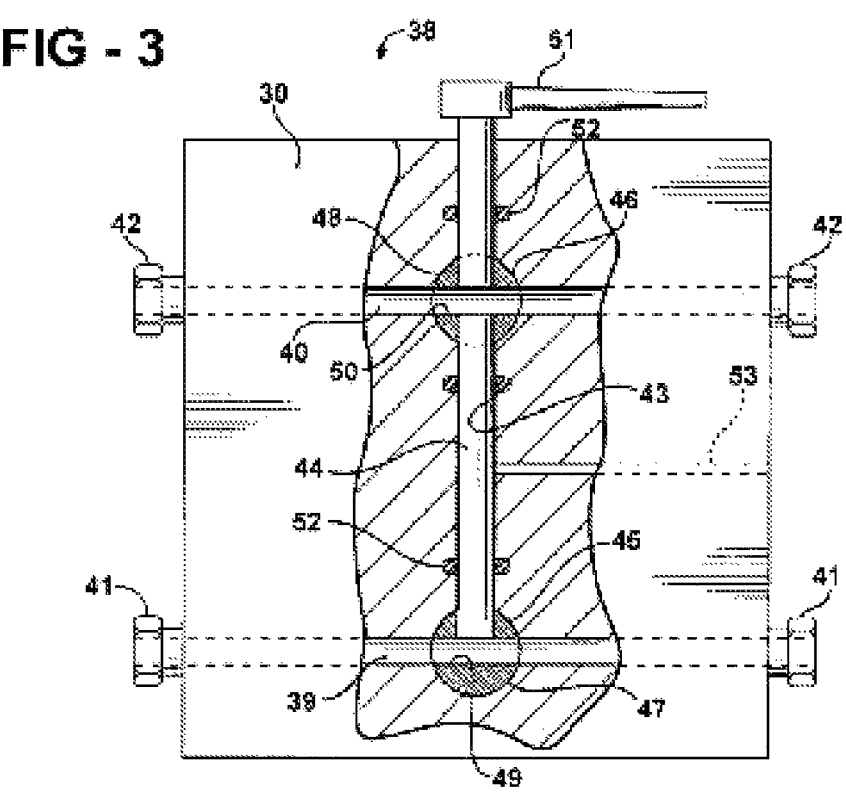
FIG. 3 is an enlarged view partly in plan and partly in section of the control valve assembly.

The valve housing 30 forms part of a control valve 38, which is best illustrated in FIG. 3, and facilitates disconnection of the second trailer 10 from the first trailer 6. The valve 38 also facilitates reconnection of the second trailer to the first trailer and insures that the service line 36 and the emergency line 35 on the second trailer are both connected to the compressed air circuits. Control valve 38 comprises the body 30 having two spaced apart, parallel passages 39 and 40 extending therethrough from end to end. The passage 39 is fitted with couplings 41 at its opposite ends by means of which the conduits 29 and 35 may be coupled to the control valve 38. At the opposite ends of the passage 40 are similar couplings 42 by means of which the pressurized fluid lines 32 and 36 may be connected to the valve. Extending from one side of the body 30 toward the opposite side is a bore 43 in which is accommodated a rotary shaft 44. At the intersection of the shaft 44 with the passage 39 is a spherical chamber 45 and a similar chamber 46 is provided at the intersection of the bore 43 with the passage 40. Rotatably accommodated in the chamber 45 is a ball valve body or rotor 47 which is fixed to the shaft 44 and a similar ball valve body or rotor 48 is accommodated in the chamber 46 and fixed to the shaft 44. The rotor 47 has a passageway 49 therethrough and a similar passageway 50 extends through the rotor 48. One end of the shaft 44 extends beyond the body 30 and has fixed thereto an operating arm or lever 51.

At intervals along the length of the shaft 44 are O-ring seals 52. Between two adjacent ones of the seals is a vent passage 53 inboard of both passages to guard against the possibility of fluid pressure flowing between the passages 39 and 40 in the event of failure of one or both of the seals.

As shown in FIG. 3, the valve rotors 47 and 48 are in a position in which pressure fluid may pass completely through the passages 39 and 40 via the couplings 41 and 42. However, upon movement of the arm 51 through a 90 degree rotation, the valve rotors will be rotated to positions in which they block the flow of pressure fluid through the valve body 30.

When the valve rotors 47 and 48 are in their open positions, as shown in FIG. 3, pressure fluid may flow freely through the passages 39 and 40. When the valve rotors are in their closed positions, however, no fluid can flow through either of the passages. Accordingly, when the trailing trailer 10 is uncoupled from the leading trailer 6, the brake operating pedal 24 is inoperative insofar as the brakes of the trailer 10 are concerned, whereupon the spring assist mechanism associated with each of the brakes of such trailer will move the brakes to their applied condition, thereby enabling the trailing trailer to be parked in a stable position. Since both of the valve rotors of the control valve 38 move simultaneously to their closed and open positions in response to operation of the crank arm 51, there is no possibility that one of the valves will be open and the other closed. Accordingly, there is no possibility that the trailing trailer's brakes will be unintentionally applied or released.

The simultaneous closing and opening of the service and emergency lines with control valve 38 ensures that the tandem trailer will not be operational—will not move even with the tractor pulling—unless the control valve 38 is properly connected to the service line 36 and emergency line 35 on the second trailer 10, and the control valve 38 is in the "on" or open position. The control valve 38 in the "off" or closed position eliminates pressure in the service line 36 and emergency line 35, and the absence of pressure allows the spring assist brake mechanisms 15 to engage and lock the wheels 12 and 13 on the second trailer 10, thereby preventing movement of the tractor 1 that is attempting to pull the second trailer 10 and the leading trailer 6. For example, if the driver forgets to open control valve 38 and no fluid pressure is present in emergency line 35, the parking brakes are applied via the spring assist brake mechanisms 15. Furthermore, if the emergency line 35 is not properly connected to control valve 38, the pressure in the line will be diminished or non-existent and the spring assist brake mechanisms 15 will engage the wheels of the second trailer.

The opening of control valve 38 provides fluid pressure to emergency line 35 that overcomes the bias of the spring assist brake mechanisms 15 and disengages and unlocks the wheels 12 and 13 on the second trailer 10, thereby allowing movement of the tractor 1 that is attempting to pull the second trailer 10 and the leading trailer 6. The dual opening and closing nature of the control valve 38 also ensures that the brake mechanisms 14 attached to the service lines 37 have pressure and are functional for the driver/operator.

In an alternative embodiment valve housing 30 forms part of a control valve 60, which is illustrated in FIGS. 4-7, and facilitates disconnection of the second trailer 10 from the first trailer 6. The valve 60 also facilitates reconnection of the second trailer to the first trailer and insures that the service line 36 and the emergency line 35 on the second trailer are both connected to the compressed air circuits. The valve 60 simultaneously opens or shuts airflow or fluid flow to both the service line and emergency lines, which supply the brake valves on a trailer. When the valve 60 is open (on) air or fluid is supplied to both the service line and emergency line. When the valve 60 is shut (off) air or fluid is cutoff to both the service line and emergency line, and a trailer may be unhooked. The valve 60 eliminates the possibility of turning emergency (parking) brakes off, and not turning the service brakes on. FIGS. 4A and 4B show the valve 60 in the off or shut position with a crank arm 61 in a down position. FIGS. 4C and 4D show the valve 60 in the on or open position with the crank arm 61 in an up position.

Control valve 60 comprises the body 30 having two spaced apart, parallel passages 62 and 63 extending therethrough from end to end. The passage 62 is the portion of the valve 60 that serves to control air or fluid flow in the service lines, and the passage 62 is configured to engage at its opposite ends conduits 32 and 36. The passage 63 is the portion of the valve 60 that serves to control air or fluid flow in the emergency lines, and the passage 63 is configured to engage at its opposite ends conduits 29 and 35. As best shown in the exploded assembly drawings of FIGS. 5A and 5B cylindrical cavities 64 and 65 intersect passages 62 and 63, respectively. The cylindrical cavities 64 and 65 accommodate a ball valve assembly 66 (shown in greater detail in FIG. 6A), which may be made of brass. The ball valve assembly 66, shown in FIG. 6A in two views with a 90 degree rotation, has a channel 67 in the spherical portion 68 for allowing air or fluid passage, which will be explained with reference to FIGS. 7A and 7B. O-rings 69 provide an air and fluid tight seal between the ball valve assembly 66 and the cylindrical cavities 64 and 65. Flange 70 extends from the ball valve assembly 66 and engages with opening 71 of the crank arm 61. The flange 70 of ball valve assembly 66 is fixedly secured to crank arm 61 with roll pins 72 inserted through pin channels 73 and 74 of the flange 70 and crank arm 61, respectively. Flange bearings 75 facilitate the smooth rotation of the ball valve assembly 66 with respect to the cylindrical cavities 64 and 65 when actuated with crank arm 61. Ball seat 76 (shown in detail in FIG. 6B), which is generally made of rubber acts as a seal against the spherical portion 68 of the ball valve assembly 66. Ball seat 76 has a center channel 77 that aligns with the channel 67 of the ball valve assembly 66 when the control valve 60 is open. Ball seat 76 is biased or pressed against the spherical portion 68 by spring 77. Spring 77 is held in the passages 62 and 63 by hex-pipe insert 78 that engages with threads 79. Flat washer 80 and snap ring 81 form a coupling mechanism for receiving conduits 32 and 29.

Figure 7A:
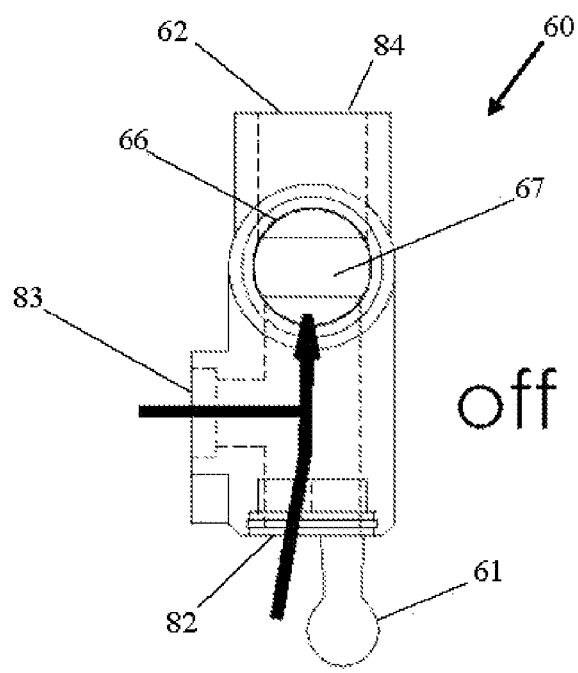
FIGS. 7A and 7B illustrate air or fluid flow through the control valve of FIGS. 4A-4D in the of and on setting.

As shown in FIG. 7A, valve 60 is in the off or shut position with a crank arm 61 is in a down position. Air or fluid, as indicated by the arrow may enter from the bottom opening 82 or rear opening 83 of the parallel passages 62 and 63, however the air or fluid flow is interrupted at the ball valve assembly 66 when channel 67 is not aligned or is perpendicular to the passages 62 and 63. It is noted that in most instances only one of the inlets—bottom opening 82 or rear opening 83 is used, and the other unused inlet is plugged.

Figure 7B:
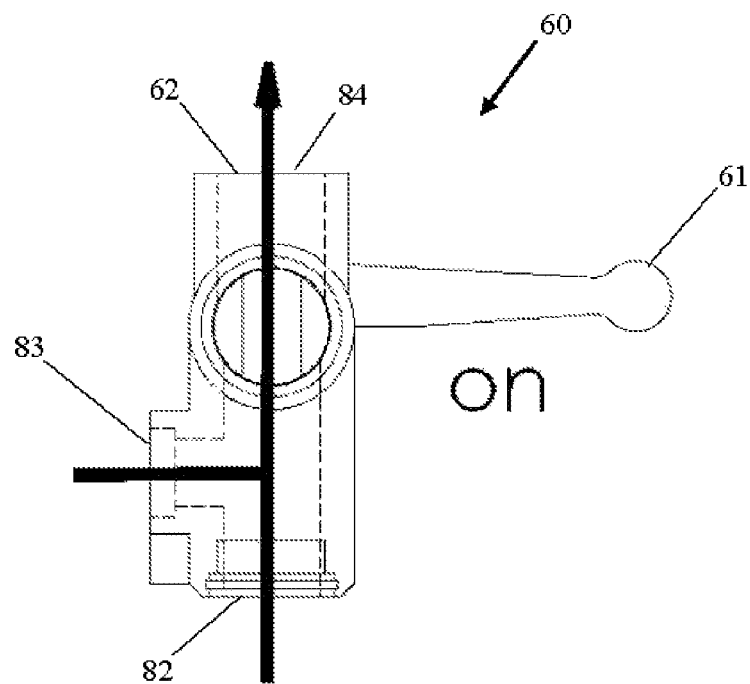

As shown in FIG. 7B, valve 60 is in the on or open position with a crank arm 61 in an up or perpendicular position. Air or fluid, as indicated by the arrow may enter from the bottom opening 82 or rear opening 83 of the parallel passages 62 and 63, and the air or fluid flow continues through channel 67 of the ball valve assembly, when channel 67 is aligned to the passages 62 and 63. When valve 60 is open, air or fluid exits at opening 84. The air exiting opening 84 of valve 60 may be coupled to a glad hand. Glad hands are coupling devices used to connect the service and emergency air lines from the truck or tractor to the trailer. The couplers have a rubber seal which prevents air from escaping. To connect the glad hands, the driver presses the two seals together with the couplers at a 90° angle to each other. A turn of the glad hand attached to the hose will join and lock the couplers.

The foregoing description is illustrative of particular embodiments of the invention, but is not meant to be a limitation upon the practice thereof. The following claims, including all equivalents thereof, are intended to define the scope of the invention.

The invention claimed:

1. A method for controlling trailer brakes, said method comprising:
controlling air or fluid flow to a service line and an emergency line that supply pressure to one or more brakes with a corresponding set of wheels on at least one or more trailers with a control valve; and
wherein said control valve simultaneously only opens or simultaneously only shuts air or fluid flow to both of said service line and said emergency line for controlling movement of a truck, said control valve comprising: a valve body having a first passage in parallel with a second passage with a defined space between said passages, said passages conducting air or fluids from a distal end to a proximal end of said valve body; a first and second cylindrical cavity each extending from opposing exterior sides of said valve body to said defined space, each of said cylindrical cavities intersecting one of said passages; a first and second ball valve assembly, each with a channel in a spherical portion of said ball valve assembly, configured for insertion into said first and second cylindrical cavities, respectively, on opposing sides of said valve body, and a flange extending from each of said ball valve assemblies; a crank arm configured for insertion in said defined space, and for receiving said flanges for fixable securement of said ball valve assemblies to said crank arm via roll pins inserted orthogonal to a rotation axis defined by said ball valve assemblies and said crank arm; wherein when said crank arm is in a first position said channels in said first and second ball valve assemblies are aligned with said first and second passages, respectively, allowing air or fluid to pass from said distal end to said proximal end of said valve body; and wherein when said crank arm is in a second position said channels in said first and second ball valve assemblies are not aligned with said first and second passages, respectively, and air or fluid is blocked from passing from said distal end to said proximal end of said valve body, wherein a valve housing forms part of said control valve and facilitates disconnection of a second trailer from a first trailer.

2. The method of claim 1 wherein said air or fluid flow in said emergency line overcomes a bias of a spring assist brake mechanisms that engages and locks said set of wheels.

3. The method of claim 2 wherein when said control valve is off or shut said air or fluid flow is cutoff to said emergency line and said spring assist brake mechanism engages and locks said set of wheels.

4. The method of claim 2 wherein when said control valve is on or open said air or fluid flow is supplied to said emergency line and said spring assist brake mechanism disengages and unlocks said set of wheels.

5. The method of claim 1 wherein when said control valve is on or open said air or fluid flow actuates said one or more brakes to engage or disengage said set of wheels in response to a driver pressing on a pedal; and
wherein said truck will not move unless said control valve is on or open.

6. A control valve comprising:
a valve body having a first passage in parallel with a second passage with a defined space between said passages, said passages conducting air or fluids from a distal end to a proximal end of said valve body;
a first and second cylindrical cavity each extending from opposing exterior sides of said valve body to said defined space, each of said cylindrical cavities intersecting one of said passages;
a first and second ball valve assembly, each with a channel in a spherical portion of said ball valve assembly, configured for insertion into said first and second cylindrical cavities, respectively, on opposing sides of said valve body, and a flange extending from each of said ball valve assemblies;
a crank arm configured for insertion in said defined space, and for receiving said flanges for fixable securement of said ball valve assemblies to said crank arm via roll pins inserted orthogonal to a rotation axis defined by said ball valve assemblies and said crank arm;
a valve housing that facilitates disconnection of a second trailer from a first trailer;
wherein when said crank arm is in a first position said channels in said first and second ball valve assemblies are aligned with said first and second passages, respectively, allowing air or fluid to pass from said distal end to said proximal end of said valve body; and
wherein when said crank arm is in a second position said channels in said first and second ball valve assemblies are not aligned with said first and second passages, respectively, and air or fluid is blocked from passing from said distal end to said proximal end of said valve body.

7. The control valve of claim 6 further comprising a rubber ball seat in each of said first and second parallel passages; and
wherein said rubber ball seats are biased or pressed against said spherical portion of said ball valve assemblies by a spring positioned in said distal ends of said first and second parallel passages.

8. The control valve of claim 6 wherein said ball valve assemblies further comprise o-rings seals to prevent the escape of air or fluids from said valve body.

9. The control valve of claim 6 wherein flange bearings are placed between said crank arm and said valve body to facilitate the smooth rotation of the ball valve assemblies respect to said cylindrical cavities when actuated with said crank arm.

10. The control valve of claim 6 wherein said first passage is used for connecting and controlling air or fluid flow in a service line for brake control; and
wherein said second passage is used for connecting and controlling air or fluid flow in an emergency line for a brake control.

11. The control valve of claim 10 wherein said crank arm simultaneously opens or shuts airflow or fluid flow through said valve body that connects to both of said service line and said emergency line.

12. The control valve of claim 10 wherein said air or fluid flow in said emergency line is used to overcome a bias provided by a spring assist brake mechanism that engages and locks a set of wheels.

13. The control valve of claim 12 wherein when said control valve is off or shut by said crank arm said air or fluid flow is cutoff to said emergency line and said spring assist brake mechanism engages and locks said set of wheels.

14. The control valve of claim 12 wherein when said control valve is on or open by said crank arm said air or fluid flow is supplied to said emergency line and said spring assist brake mechanism disengages and unlocks said set of wheels.

15. The control valve of claim 6 wherein said control valve is part of a brake system for tandem truck trailers.

16. The control valve of claim 6 wherein said airflow from said control valve is supplied to a glad hand.

\* \* \* \* \*